May 31, 1966  O. GRANNING  3,253,840
PNEUMATIC LIFT SYSTEM FOR A TRACTOR-TRAILER HITCH
Filed April 23, 1964  3 Sheets-Sheet 3
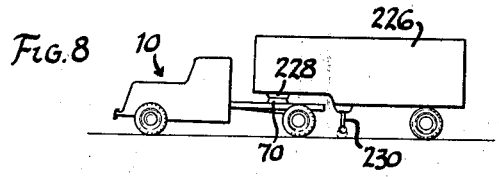
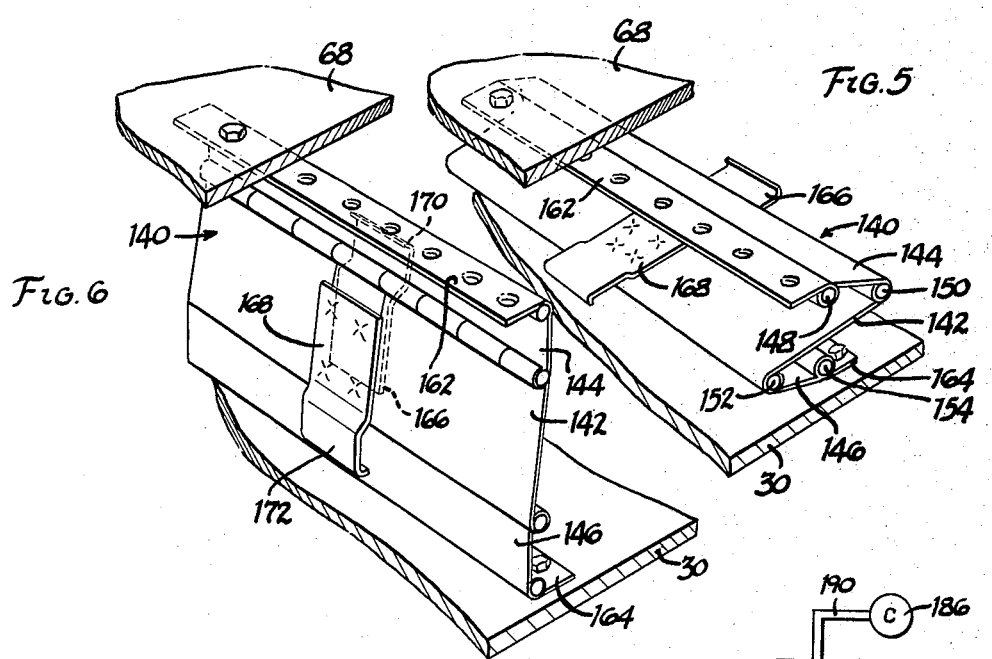
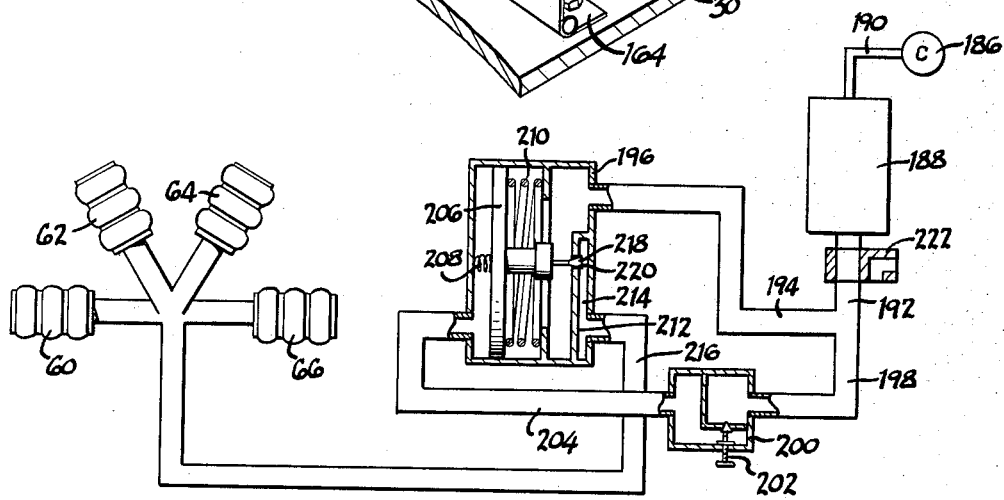
INVENTOR.
OLE GRANNING
BY
WILSON, SETTLE & CRAIG
ATTORNEYS

United States Patent Office 3,253,840
Patented May 31, 1966

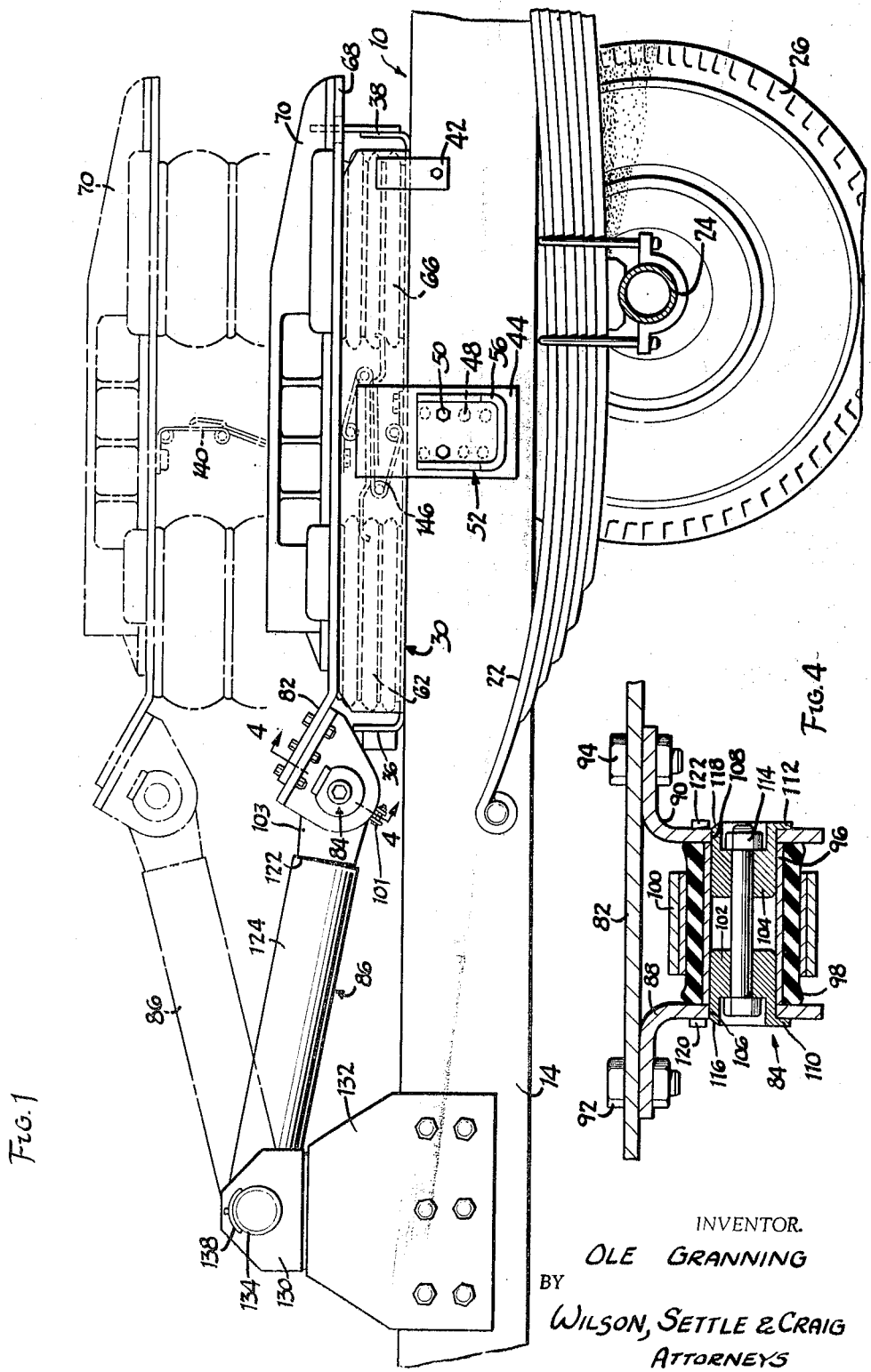

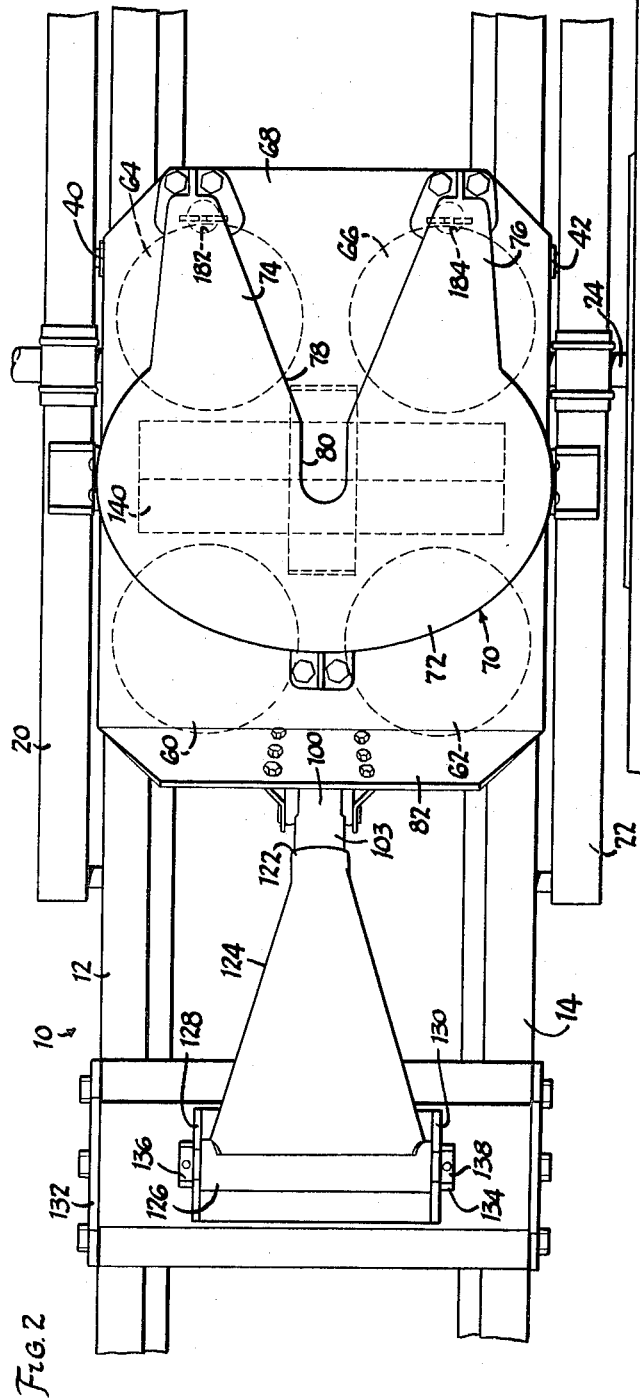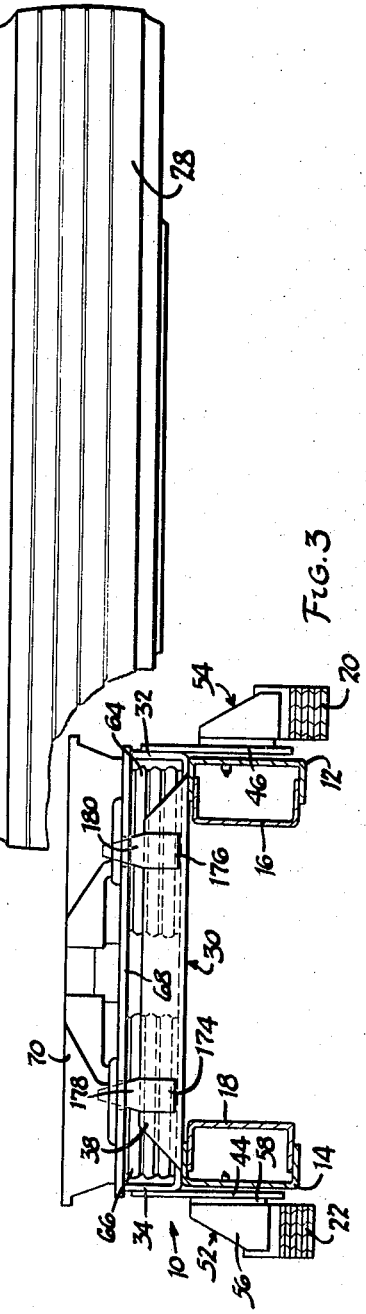

1

3,253,840
PNEUMATIC LIFT SYSTEM FOR A TRACTOR-TRAILER HITCH
Ole Granning, Detroit, Mich., assignor to Ole Granning Trailer Service Inc., Dearborn, Mich., a corporation of Michigan
Filed Apr. 23, 1964, Ser. No. 362,008
6 Claims. (Cl. 280—425)

This invention relates to a pneumatic lift system for a tractor-trailer hitch mechanism, and more particularly to a pneumatic lift system employing flexible air bags, the system including means for protecting the air bags against lateral deformation to thus prevent damage to the bags.

The present invention is particularly adapted for use on truck trailers utilized as yard trucks in freight terminals. Yard trucks are provided in freight terminals to move semi-trailers to different positions within the terminal. In a typical situation, an over-the-road truck tractor may deliver a loaded semi-trailer to the terminal. The semi-trailer may first be parked to await unloading. As is well known, semi-trailers are provided with a retractable landing gear. The landing gear is conventionally of the hand-crank type and must be cranked downwardly to engage the ground to support the semi-trailer when the truck tractor is unhitched. When the over-the-road truck tractor has parked the semi-trailer, it is normally dispatched to perform other duties. The yard truck tractor is subsequently utilized to move the semi-trailer within the terminal as necessary. In the illustrative case, the yard truck tractor will be called upon to move the semi-trailer to the freight dock for unloading and subsequently to park the semi-trailer in a suitable location within the terminal or possibly to another position on the dock for reloading. The semi-trailer may thus be moved several times within the terminal before it is again hitched to an over-the-road truck tractor for transport to a new destination.

Each time that the semi-trailer is moved within the terminal area, the landing gear must be retracted to lower the semi-trailer onto the hitching device provided on the yard truck and must be again extended when the semi-trailer is parked and the yard truck is unhitched. As will be appreciated, considerable time is consumed in cranking the landing gear in and out of its ground engaging position. The time consumed in this cranking operation is not only reflected in the wages of the driver but also is reflected in the requirement for a considerable number of yard trucks to perform the necessary movement of semi-trailers in the terminal. It has been proposed in the past to provide an hydraulically actuated hitching device on the truck tractor which can be raised and lowered when engaged with the semi-trailer to lift the front end of the trailer and avoid the necessity of retracting the landing gear. Such hydraulic devices have been operable but are expensive. I have solved this problem by providing a simple, inexpensive pneumatic lift system for the truck tractor hitch.

An object of the invention is thus to provide a pneumatic lift system for a tractor-trailer hitch.

Another object of the invention is to provide a plurality of inflatable flexible bags for raising and lowering the truck tractor hitch element, this element being referred to as a fifth wheel.

2

A further object of the invention is to provide a support platform for the fifth wheel, the support platform being secured to the upper ends of the pneumatic bags.

A still further object of the invention is to provide a rigid pivotal element for securing the support platform against movement along the longitudinal axis of the tractor.

Another object of the invention is to provide a hinge structure extending between the underside of the support platform and the truck tractor frame to secure the support platform against movement transverse to the longitudinal axis of the tractor.

A still further object of the invention is to provide locking means engageable with the support platform when this platform is in its lowermost position to supplement the normal locking means against the severe jars occasioned when the truck tractor is backed into engagement with the semi-trailer.

A yet further object of the invention is to provide a lift system which is securable to the frame members of existing truck tractor designs without having any structure which extends into the space between the frame members, this space being reserved for structure forming part of the truck tractor design.

A further object of the invention is to provide a stop structure for engaging the leaf springs of the truck tractor to prevent the springs from deflecting when a load is applied to the truck tractor, thus preventing the extended landing gear of the semi-trailer from being lowered by the truck tractor springs to a position where it again would engage the ground.

Other objects of this invention will appear in the following description and appended claims, reference being had to the accompanying drawings, forming a part of this specifiaction wherein like reference characters designate corresponding parts in the several views.

In the drawings:

FIGURE 1 is a side elevational view of a portion of a truck tractor illustrating one embodiment of my pneumatic lift system for the tractor hitch;

FIGURE 2 is a top plan view of the truck tractor of FIGURE 1;

FIGURE 3 is an end view of the truck tractor of FIGURE 1;

FIGURE 4 is a sectional view taken substantially along the line 4—4 of FIGURE 1 looking in the direction of the arrows;

FIGURE 5 is a perspective view of the hinge structure for the fifth wheel support platform shown in the retracted position;

FIGURE 6 is a perspective view of the hinge structure of FIGURE 5 illustrated in the extended position;

FIGURE 7 is a diagrammatic view of the pneumatic circuitry for the inflatable bags; and FIGURE 8 is a side elevational view of a truck tractor hitched to a semi-trailer, the truck tractor incorporating my pneumatic lift system.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURES 1–3, it will be seen that my invention is applied to a truck tractor 10 having a frame comprising parallel, spaced apart channel members 12, 14 having interlocked therein channel members 16, 18 to form rigid, strong support beams. A suspension system comprising leaf springs 20, 22 is secured to the outer sides of the channels 12, 14. The leaf springs 20, 22 support an axle structure 24 on which is mounted drive wheels 26, 28.

A support plate 30 having upturned sides 32, 34 and ends 36, 38 is mounted on the channel elements 12, 14 in a position over the axle 24. The support plate 30 has downwardly extending tabs 40, 42 at the rearward end thereof which are bolted to the channel members 12, 14 to secure the plate in place.

A second set of downwardly extending securement plates 44, 46 are provided on the sides 32, 34 at approximately the center thereof. The plates 44, 46 have a plurality of vertically spaced openings 48, one pair of which is utilized to receive bolts 50 for securement of the plates 44, 46 to the channels 12, 14 and for the securement of stop members 52, 54 to the plates.

Each of the stop members comprises a U-shaped section 56 having a back plate 58 secured thereto as by welding. The stop members 52, 54 are positioned over the leaf springs 20, 22. The lower surface of each of the U-shaped sections 56 is adjusted, by proper selection of openings 48, a distance above the leaf springs which, in practice, is found to be preferably from .75 inch to 2 inches. In operation, when a load is applied to the truck tractor 10, the leaf springs 20, 22 will normally deflect thus lowering the entire tractor frame. For the purpose of the present invention, lowering of the tractor frame when a load is applied is undesirable. When the stop members 52, 54 contact the springs 20, 22, further deflection of the springs is prevented and the tractor frame is thus stabilized at the desired vertical level.

Four inflatable bags 60, 62, 64, 66 are mounted on the upper surface of the support plate 30. As will be noted in FIGURE 2, the bags 60, 62, 64, 66 are spaced apart and each bag is positioned adjacent one corner of the plate 30. The inflatable bags are of conventional structure and have, in the past, been widely used as pneumatic springs.

The upper ends of the bags 60, 62, 64, 66 are secured to the undersurface of a second support plate 68. The plate 68 has bolted thereon the fifth wheel 70. The fifth wheel 70 is of conventional structure having a generally circular bearing surface 72 for support of a corresponding bearing surface on a semi-trailer. Legs 74, 76 extend rearwardly to define a V-shaped groove 78 for receiving and guiding the hitch element of a semi-trailer into U-shaped groove 80 where it is locked in place to securely hitch the truck tractor to the semi-trailer.

The forward end portion 82 of the support plate 68 is angled upwardly and has bolted to the underside thereof a resilient coupling 84 for coupling the plate 68 to a drawbar 86. Referring to FIGURE 4, it will be noted that the coupling 84 comprises a pair of spaced apart brackets 88, 90 which are secured to the end portion 82 by nut and bolt assemblies 92, 94. A metallic sleeve 96 having a tubular resilient element 98 adhered thereon is received between the brackets 88, 90. The drawbar yoke 100 is pivotally received on the resilient element 98. The yoke 100 has a split-ring configuration and is tightened by nut and bolt structure 101 to prevent slippage with respect to resilient element 98. The entire assembly is held in place by bearing elements 102, 104, which extend through openings 106, 108 in the brackets 88, 90. The bearing elements 102, 104 have flanges 110, 112 to prevent the entire insertion thereof into the sleeve 96. A nut and bolt assembly 114 secures the bearing elements 102, 104 in place. Flats 116, 118 are provided on flanges 110, 112 for engagement with stops 120, 122 on the brackets 88, 90 to prevent rotation of the bearing elements 102, 104.

The yoke 100 has a projection 103 which extends into the cylindrical end 122 of V-shaped drawbar element 124 and is welded in place. The other end of the V-shaped element 124 is welded to a cylindrical sleeve 126. The sleeve 126 is positioned between spaced apart bracket elements 128, 130 of a bracket 132. The bracket 132 is bolted to channel elements 12, 14. A sleeve 134 extends through openings in the bracket elements 128, 130 and through the cylindrical sleeves 126 to pivotally support the sleeve 126. Stop elements 136, 138 are bolted on each end of the sleeve 134 to prevent axial movement of the sleeve.

From the structure thus described, it will be appreciated that all of the forces which are applied to the fifth wheel 70 along the longitudinal axis of the tractor 10 are absorbed by the rigid elements comprising the bracket 132, drawbar 86 and support plate 68. None of these forces are applied to the inflatable bags 60, 62, 64, 66. The resilient coupling 84 functions to cushion sudden shocks applied to this assembly to prevent snapping of one of the components.

Transverse stresses applied to the fifth wheel 70 are absorbed by a hinge structure 140 provided between the support plates 30, 68. As will be noted in FIGURE 2, the hinge structure 140 is elongated and extends almost the entire width of the plates 30, 68. The hinge 140 is positioned between the forward inflatable bags 60, 62 and rearward bags 64, 66.

The structure and operation of the hinge 140 is best illustrated in FIGURES 5 and 6. The hinge 140 comprises a relatively wide center hinge plate 142 which is hingedly secured to relatively narrow upper and lower hinge plates 144, 146. The hinge 140 is of the piano-type with each of the hinge plates having inter-fitting loop portions which are interconnected by means of pins 148, 150, 152, 154 which extend therethrough. The upper hinge plate 144 is hingedly secured to mounting plate 162 which is bolted to the undersurface of the upper support plate 68. The lower hinge plate 146 is hingedly secured to mounting plate 164 which is secured by bolts to the upper surface of the lower support plate 30.

Guide members 166, 168 are secured by spot welding to either side of the center hinge plate 142. Guide member 166 has an extending finger 170 which contacts the upper hinge plate 144 when the hinge is moved from the collapsed position of FIGURE 5 to the extended position of FIGURE 6. A similar finger 172 is provided on the guide member 168 for engagement with the lower hinge plate 146. The function of the guide members 166, 168 is to guide the hinge plates into the positions illustrated in FIGURES 5 and 6 and the guide members prevent over-center travel of the hinge plates. If the guide members 166, 168 were not present, when the hinge was collapsed from the FIGURE 5 position, the lower hinge plate 146 could, for example, pivot to the right instead of to the left as viewed in FIGURE 6, with the upper hinge plate 144 also pivoting to the left, thus causing the hinge to collapse improperly resulting in destruction of the hinge. The hinge does not necessarily have to have three hinge plates. However, there must be at least three pivot axes in the hinge structure.

The hinge structure thus illustrated forms a compact collapsed unit which will fit within the space between the forward inflatable bags 60, 62, and the rearward bags 64, 66. The elongated hinge structure 140 provides considerable strength in the sideward or transverse direction and prevents damage to the inflatable bags as a result of sideward thrust applied to the fifth wheel 70.

Referring to FIGURES 2 and 3, it will be noted that a locking structure is provided to engage the upper support plate 68 when the inflatable bags are deflated and the plate is in its lowermost position. The locking structure comprises a pair of spaced apart detent members 174, 176 which are welded to the end wall 38 of the lower support plate 30. The members 174, 176 have upwardly extending V-shaped portions 178, 180 which are received within circular openings 182, 184 of the upper support plate 68 when this plate is in its lowermost position. The side edges of the V-shaped portions 178, 180 engage the inner peripheries of the openings 182, 184 to firmly secure the support plate 68 against transverse movement. The members 174, 176 are provided in addition to the hinge 140 to absorb the high shock stresses which may be applied to the fifth wheel 70 when the tractor 10 is backed into a trailer for engagement therewith.

The pneumatic circuit for inflating the bags 60, 62, 64, 66 is illustrated diagrammatically in FIGURE 7. A small air compressor 186 is provided on the tractor 10. The compressor 186 is connected to a reservoir 188 by conduit 190. A supply of air under pressure is thus maintained in the reservoir 188. A conduit 192 leads from the reservoir 188 and has one branch 194 which extends to a pressure regulating valve 196. A second branch 198 extends to a throttle valve 200. The valve 200 has a manually actuable valve element 202 which functions as a variable restriction to throttle the air pressure. A conduit 204 leads from the valve 200 to the regulating valve 196. The regulating valve 196 has a piston 206 which is biased by a relatively strong spring 208 in one direction and a relatively weak spring 210 in the opposite direction. A wall 212 defines an outlet chamber 214 from which leads a conduit 216 to supply air under pressure to the inflatable bags 60, 62, 64, 66. The piston 206 carries a valve element 218 which acts, in combination with orifice 220 in the wall 212, to throttle the air pressure passing therethrough. In operation, the valve 196 is a constant pressure outlet valve, the pressure thereof being, however, adjusted in accordance with the setting of the throttle valve 200. As will be appreciated, a lower pressure may be applied to the bags 60, 62, 64, 66 when the truck tractor is being hitched to an empty semi-trailer. A higher pressure should be applied when the semi-trailer is fully loaded. A two position valve 222 is provided in the conduit 192. In one position, the valve 222 closes the reservoir side of conduit 192 and vents the other side to atmosphere to deflate the bags 60, 62, 64, 66 to unhitch the tractor from a semi-trailer. The second position of valve 222 opens communication between the reservoir and bags to inflate the bags. Manual controls for the throttle valve 200 and valve 222 may be placed within the tractor cab for easy access by the driver.

The operation of my invention may be best understood by referring to FIGURES 1 and 8. As will be noted in FIGURE 1, when the bags 60, 62, 64, 66 are inflated, the fifth wheel 70 is raised upwardly as shown in dotted lines. The drawbar 86, being of fixed length, pulls the support plate 68 slightly forwardly with respect to its lowermost position. This slight forward movement is compensated for by the flexibility of the inflatable bags. As shown in FIGURE 8, the tractor 10 is connected to a semi-trailer 226 by securement of the fifth wheel 70 to the complementary structure 228 provided on the trailer. The landing gear 230 of this trailer is in the extended position and normally engages the ground to support the forward end of the trailer. After the fifth wheel 70 has been attached to the trailer, the bags 60, 62, 64, 66 are inflated, raising the forward end of the trailer as illustrated and lifting the landing gear 230 out of engagement with the ground. The trailer may then be moved to the desired location, whereupon the bags are deflated until the landing gear 230 again engages the ground. The fifth wheel 70 is then unhitched and the truck tractor may be driven to a new job. As will be appreciated, raising and lowering of the landing gear 230 is entirely avoided during movement of the trailer 226 thus resulting in a significant time saving.

Having thus described my invention, I claim:

1. In a truck tractor having a frame, inflatable bag means mounted on the frame, a fifth wheel mounted on the inflatable bag means to be raised and lowered thereby, means to inflate and deflate said bag means, rigid drawbar means pivotally mounted at one end to the fifth wheel and pivotally mounted at the other end to the frame at a location forwardly of the fifth wheel to absorb stresses applied to the fifth wheel along the longitudinal axis of the truck tractor, the pivotal attachment of said one end of the drawbar means to the fifth wheel including a resilient element between the drawbar means and the fifth wheel to absorb shock stresses applied to the fifth wheel, and extensible transverse support means beneath the fifth wheel extending between the fifth wheel and frame to absorb stresses applied to the fifth wheel at right angles to the longitudinal axis of the truck tractor.

2. In a truck tractor having a frame, inflatable bag means mounted on the frame, a fifth wheel mounted on the inflatable bag means to be raised and lowered thereby, means to inflate and deflate said bag means, rigid pivotal drawbar means extending from the fifth wheel to a forward portion of the frame to absorb stresses applied to the fifth wheel along the longitudinal axis of the truck tractor, extensible transverse support means beneath the fifth wheel extending between the fifth wheel and frame to absorb stresses applied to the fifth wheel at right angles to the longitudinal axis of the truck tractor, and cooperating detent and aperture means on the fifth wheel and frame which engage when the fifth wheel is in the lowered position to interlock and provide additional transverse support for the fifth wheel in the lowered position.

3. In a truck tractor having a frame, leaf spring means on each side of the frame for suspension of an axle assembly, inflatable bag means mounted on the frame, a fifth wheel mounted on the inflatable bag means to be raised and lowered thereby, means to inflate and deflate said bag means, rigid pivotal drawbar means extending from the fifth wheel to a forward portion of the frame to absorb stresses applied to the fifth wheel along the longitudinal axis of the truck tractor, extensible transverse support means beneath the fifth wheel extending between the fifth wheel and frame to absorb stresses applied to the fifth wheel at right angles to the longitudinal axis of the truck tractor, and a stop structure on each side of the frame positioned over said leaf spring means for abutment against the leaf spring means to prevent deflection thereof upon application of a load to the fifth wheel.

4. In a truck tractor having a frame, inflatable bag means mounted on the frame, a fifth wheel mounted on the inflatable bag means to be raised and lowered thereby, means to inflate and deflate said bag means, rigid pivotal drawbar means extending from the fifth wheel to a forward portion of the frame to absorb stresses applied to the fifth wheel along the longitudinal axis of the truck tractor, and a hinge beneath the fifth wheel extending between the fifth wheel and frame, said hinge having at least three pivot axes, the pivot axes of said hinge being transverse to the longitudinal axis of the truck tractor to absorb stresses applied to the fifth wheel at right angles to the longitudinal axis of the truck tractor.

5. In a truck tractor having a frame, inflatable bag means mounted on the frame, a fifth wheel mounted on the inflatable bag means to be raised and lowered thereby, means to inflate and deflate said bag means, rigid pivotal drawbar means extending from the fifth wheel to a forward portion of the frame to absorb stresses applied to the fifth wheel along the longitudinal axis of the truck tractor, hinge means beneath the fifth wheel extending between the fifth wheel and frame, said hinge means including at least three hinge leaves, the pivot axes of said hinge leaves being transverse to the longitudinal axis of the truck tractor, said hinge leaves being elongated in a direction transverse to the longitudinal axis of the truck tractor to absorb stresses applied to the fifth wheel at right angles to the longitudinal axis of the truck tractor.

6. An apparatus as defined in claim 5 and further characterized in that a guide structure is provided on the hinge leaves to prevent over center travel of adjacent hinge leaves with respect to each other.

References Cited by the Examiner

UNITED STATES PATENTS

| | | |
|---|---|---|
| 2,733,931 | 2/1956 | Reid et al. |
| 2,903,256 | 9/1959 | Weiss. |
| 2,919,930 | 1/1960 | Cislo. |
| 2,928,684 | 3/1960 | Geiger ------------ 280—425 |
| 3,074,739 | 1/1963 | Alfieri ------------ 280—124 |

FOREIGN PATENTS 1,324,996    3/1963    France.

LEO FRIAGLIA, *Primary Examiner.*